April 22, 1952     C. L. WALTERS     2,593,636
AUTOMATIC CARRIAGE PULLER FOR CASE BALERS
Filed June 24, 1949     2 SHEETS—SHEET 1
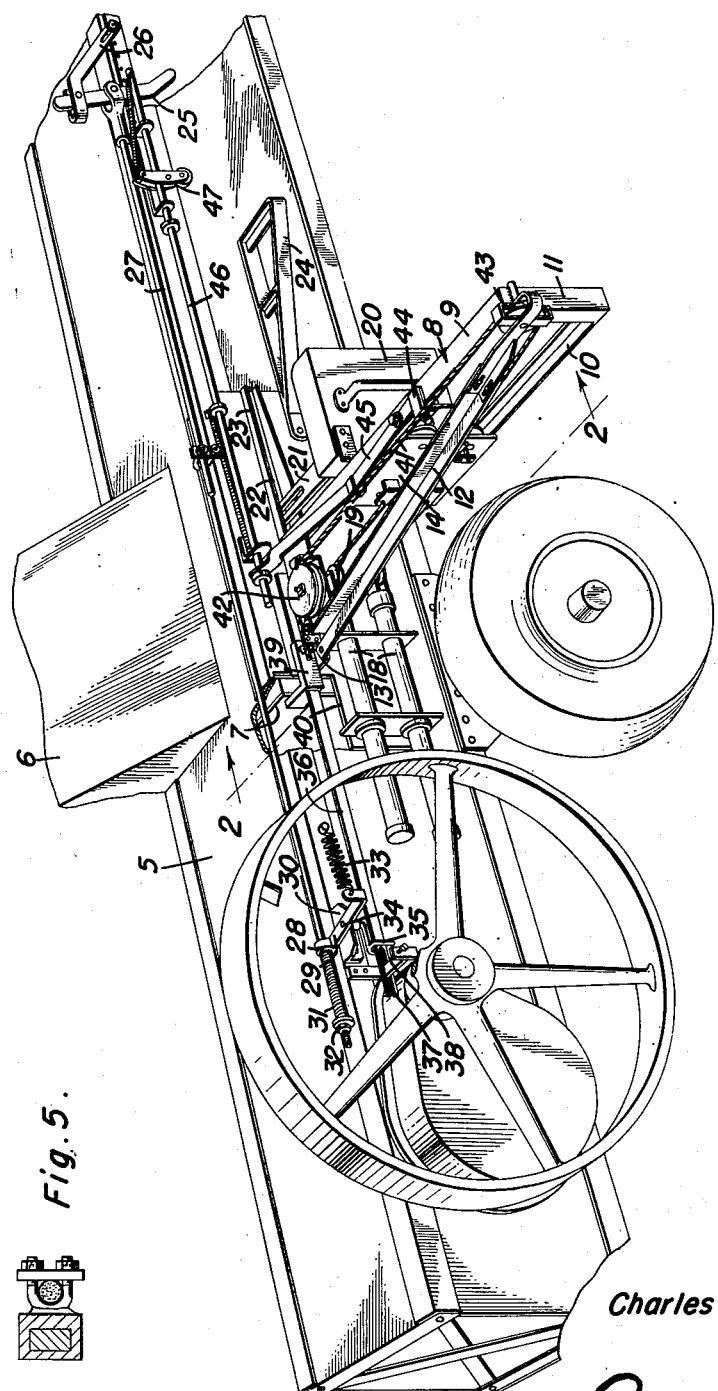
Inventor
Charles L. Walters
By *Clarence A. O'Brien and Harvey B. Jacobson*
Attorneys April 22, 1952 C. L. WALTERS 2,593,636
AUTOMATIC CARRIAGE PULLER FOR CASE BALERS
Filed June 24, 1949 2 SHEETS—SHEET 2
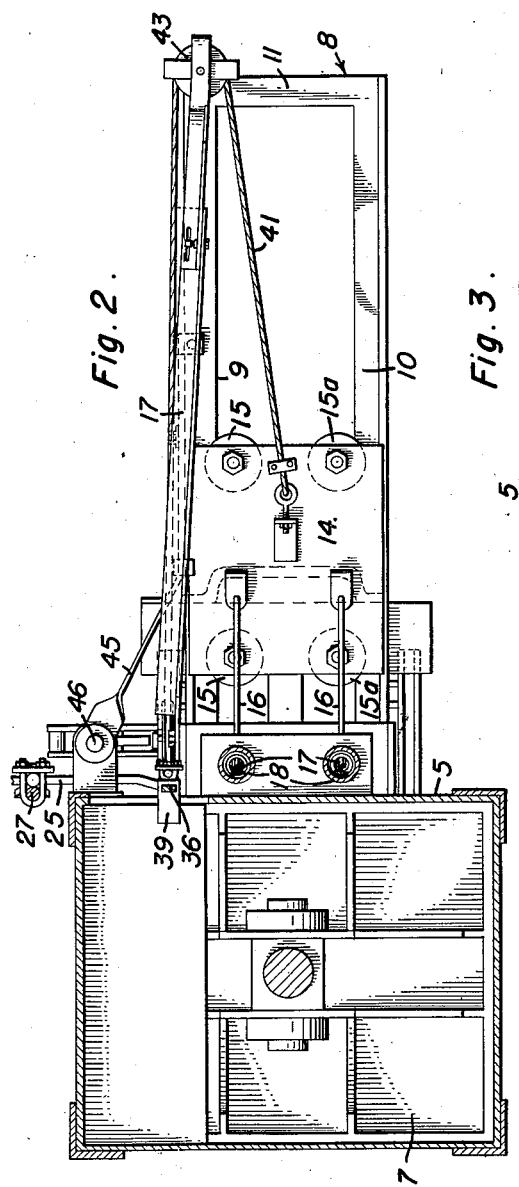
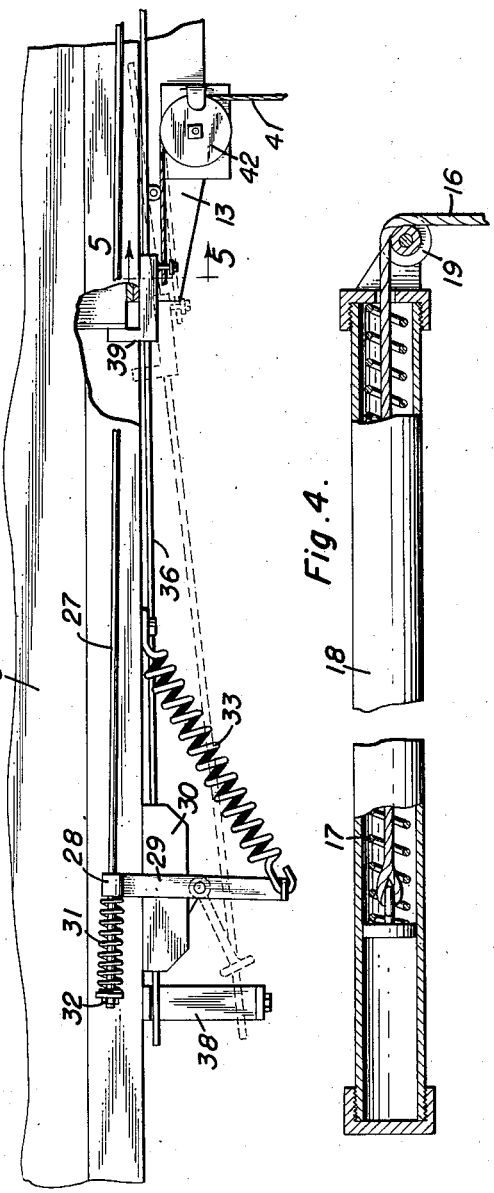
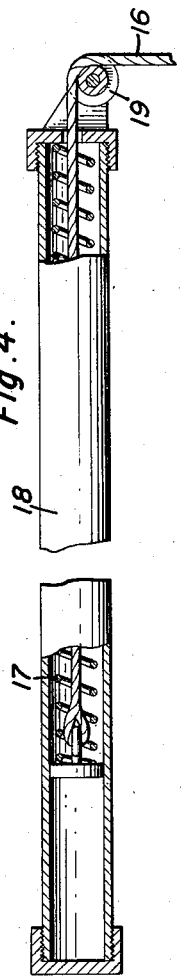
Inventor
Charles L. Walters Patented Apr. 22, 1952

2,593,636

UNITED STATES PATENT OFFICE 2,593,636

AUTOMATIC CARRIAGE PULLER FOR CASE BALERS

Charles L. Walters, Prague, Okla.

Application June 24, 1949, Serial No. 101,141

4 Claims. (Cl. 100—24)

The present invention relates to new and useful improvements in hay balers and more particularly to an automatic carriage puller for the bale divider of a type employed in a Case baler as covered by Patent No. 2,362,861 dated November 14, 1944.

An important object of the invention is to provide mechanism movable into the path of the return stroke of the baler plunger to utilize the plunger for pulling the carriage outwardly to receive a divider; trip means operated by the divider upon completion of a baling action to move the mechanism into position for operation by the plunger; and spring means for pushing the carriage and divider inwardly to start a new baling action.

A further object is to provide an automatic carriage puller and pusher to relieve the baler operator of the manual labor usually required for this purpose.

Another object is to provide an apparatus of this character of simple and practical construction, which is efficient and reliable in operation, relatively inexpensive to manufacture, and install in operative position on a baler without necessitating any material changes or alterations in construction of the baler, and which is otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view;

Figure 2 is a transverse sectional view taken on a line 2—2 of Figure 1;

Figure 3 is a top plan view of the plunger engaging dog;

Figure 4 is an enlarged top plan view of one of the carriage pushing springs, with parts shown in section, and Figure 5 is an enlarged sectional view taken on a line 5—5 of Figure 3.

Referring now to the drawings in detail, wherein for the purpose of illustration I have disclosed a preferred embodiment of my invention, the numeral 5 designates a baler chamber into which hay or the like is fed from a transverse conveyor housing 6. A plunger 7 works in the front portion of chamber 5 and is power operated in the usual manner in a reciprocating movement to compress the hay in the chamber.

A bracket or track 8 projects outwardly from one side of the chamber 5 and includes upper and lower rails 9 and 10 connected at their outer ends to a strut or post 11. A brace 12 extends from the outer end of bracket 8 to a bracket 13 suitably secured to the side of chamber 5.

A carriage 14 is provided with upper and lower pairs of inner and outer rollers 15 and 15a travelling on rails 9 and 10 to move the carriage inwardly and outwardly of track 8, the carriage being moved inwardly by cables 16 connecting the carriage to coil springs 17 enclosed in cylinders 18. The cylinders 18 are suitably secured horizontally one above the other to the side of chamber 5 at a right angle to the carriage 14. The cables 16 extend out of corresponding ends of the cylinders 18 to the carriage 14 and are trained over pulleys 19 journalled on said ends of the cylinders.

A divider holder or carriage box is secured to one side of carriage 14 to which dividers 21 are detachably secured for insertion transversely into chamber 5 through the usual slots 22. Channeled guides 23 are provided for the divider on the side of the chamber as the divider moves with the hay toward the delivery end of the chamber and an outwardly inclined cam track 24 is secured to the side of the chamber along which the divider rides to pull the divider partially outwardly from the bale of hay.

A trip arm 25 is pivoted to chamber 5 by means of an inclined arm 26 with the lower end of the trip arm disposed in the path of the divider during its movement with the hay and a rod 27 is connected at one end to trip arm 25 and is slidable adjacent its other end in a guide 28 at the inner end of a horizontally swingable support 29 pivoted at its central portion on a bracket 30. A coil spring 31 is held on rod 27 against guide 28 by a nut 32 threaded on the rod. A coil spring 33 connnects the outer end of support 29 to the chamber 5.

The pivot 34 for support 29 is provided with a downwardly extending shifting fork 35 straddling the free end of a bar 36 which is freely movable toward and away from the side of chamber 5 by means of a slot 37 in the bar sliding on a bracket 38 projecting outwardly from the chamber.

The bar 36 extends longitudinally along the side of chamber 5 and is pivoted at its rear end to bracket 13.

An L-shaped dog 39 is slidably mounted on bar 36 and projects inwardly of the chamber 5 through a slot 40 therein for movement into and out of the path of plunger 7 during its return or rear stroke. A cable 41 is attached at one end to dog 39 and extends around a pulley 42 journalled on bracket 13 and outwardly therefrom along carriage bracket or track 8 and around a pulley 43 journalled at the outer end of the carriage bracket or track and then inwardly from pulley 43 for attaching to carriage 14.

The holder 20 and carriage 14 are held in an outward position by the latch 44 at the outer end of pivoted lever 45 which is actuated by the regular trip rod 46 and trip 47 of the baler. The trip 47 is positioned forwardly of trip 25 to actuate trip 47 in advance of trip 25.

In the operation of the device, trip bar 36 is held outwardly from the side of chamber 5 by spring 33 which overcomes tension of spring 31 to swing fork 35 outwardly and holds dog 39 clear of plunger 7 as shown by broken lines in Figure 3.

As the divider 21 (previously placed in chamber 5 and embedded in the hay) moves rearwardly with the hay, the divider is pulled outwardly as it travels along cam track 24 and is allowed to continue its rearward movement until it strikes front trip 47 which releases holder 20 and carriage 14 to insert another divider into the chamber by the action of springs 17 pulling carriage 14 and holder 20 inwardly.

As the first divider continues its rearward travel, it then actuates trip 25 which pulls rod 27 rearwardly and rocks support 29 and fork 35 to swing bar 36 inwardly toward chamber 5 and moves dog 39 in the path of plunger 7 to carry the dog with the plunger during the return stroke of the latter. The cable 41 connecting dog 39 to carriage 14 then pulls the carriage outwardly, where it is held by latch 44.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a power operated hay baler of a type including a baling chamber having a reciprocating plunger a spring actuated unitary carriage and divider holder for inserting a divider in hay being baled in the chamber to travel with the hay, and a trip for controlling actuation of said carriage and divider holder, means for returning the carriage and divider holder to its reloading position and comprising a second trip in the path of a divider moving with the hay, a bar pivoted at one end at one side of the chamber in a longitudinal position for inward and outward swinging movement, spring means holding the bar outwardly, a pivoted yoke engaging the bar to actuate the bar, means connecting the yoke to the second trip to swing the bar inwardly, a dog slidably mounted on the bar and movable thereby into the path of the plunger to carry the dog with the plunger during a predetermined movement thereof, and means connecting the dog to the carriage.

2. In a power operated hay baler of a type including a baling chamber having a reciprocating plunger, and a unitary carriage and divider holder for inserting a divider into hay in the chamber to travel therewith, said carriage and divider holder being retractile after insertion of the divider, means on said chamber for retracting said carriage and divider holder operative by said plunger under control of the traveling divider comprising a slide member, operating connections between said slide member and said carriage and divider holder, a pivoted support for said slide member swingable to move said member into the path of said plunger for engagement with and sliding by said plunger, and means operative by travel of said divider to swing said support, said slide member being slidable laterally of the path of movement of said carriage and divider holder, said operating connections comprising a carriage and divider holder retracting cable operatively connecting said slide member to said carriage and divider holder.

3. In a power operated hay baler of a type including a baling chamber having a reciprocating plunger, and a unitary carriage and divider holder for inserting a divider into hay in the chamber to travel therewith, said carriage and divider holder being retractile after insertion of the divider, means on said chamber for retracting said carriage and divider holder operative by said plunger under control of the traveling divider comprising a slide member, operating connections between said slide member and said carriage and divider holder, a pivoted support for said slide member swingable to move said member into the path of said plunger for engagement with and sliding by said plunger, and means operative by travel of said divider to swing said support, said pivoted support comprising a laterally swingable bar, said last-named means comprising a pivoted yoke straddling said bar and swingable to swing said bar.

4. In a power operated hay baler of a type including a baling chamber having a reciprocating plunger, and a unitary carriage and divider holder for inserting a divider into hay in the chamber to travel therewith, said carriage and divider holder being retractile after insertion of the divider, means on said chamber for retracting said carriage and divider holder operative by said plunger under control of the traveling divider comprising a slide member, operating connections between said slide member and said carriage and divider holder, a pivoted support for said slide member swingable to move said member into the path of said plunger for engagement with and sliding by said plunger, and means operative by travel of said divider to swing said support, said pivoted support comprising a laterally swingable bar, said last-named means comprising a pivoted yoke straddling said bar and swingable to swing said bar, and a pull rod pivoted to said yoke to swing the same.

CHARLES L. WALTERS.

REFERENCES CITED

The following references are of record in the file of this patent:

UNITED STATES PATENTS

| Number | Name | Date |
| --- | --- | --- |
| 1,232,984 | Scholl | July 10, 1917 |
| 1,412,021 | Welger | Apr. 4, 1922 |
| 2,450,928 | Allison | Oct. 12, 1948 |